(12) United States Patent
Kashima et al.

(10) Patent No.: US 10,696,141 B2
(45) Date of Patent: Jun. 30, 2020

(54) SYNCHRONOUS MOTOR CONTROL DEVICE AND METHOD OF CONTROLLING SYNCHRONOUS MOTOR

(71) Applicant: Mitsubishi Electric Corporation, Tokyo (JP)

(72) Inventors: Mitsuo Kashima, Tokyo (JP); Tomohiro Kutsuki, Tokyo (JP); Tomomi Higashikawa, Tokyo (JP); Akiyoshi Muramatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/744,923

(22) PCT Filed: Aug. 4, 2015

(86) PCT No.: PCT/JP2015/072118
§ 371 (c)(1),
(2) Date: Jan. 15, 2018

(87) PCT Pub. No.: WO2017/022083
PCT Pub. Date: Feb. 9, 2017

(65) Prior Publication Data
US 2018/0208023 A1 Jul. 26, 2018

(51) Int. Cl.
*B60H 1/32* (2006.01)
*F25B 49/02* (2006.01)
(Continued)

(52) U.S. Cl.
CPC ......... *B60H 1/3222* (2013.01); *F25B 49/025* (2013.01); *H02P 21/00* (2013.01);
(Continued)

(58) Field of Classification Search
CPC .. H02P 21/00; H02P 27/04; H02P 1/00; H02P 25/022; H02K 1/223; H02K 21/042; H02K 11/048
See application file for complete search history.

(56) References Cited

U.S. PATENT DOCUMENTS 7,855,526 B2 * 12/2010 Ohnishi ................. H02P 21/24
318/700
9,059,653 B2 * 6/2015 Shimada ................. H02P 6/183
(Continued)

FOREIGN PATENT DOCUMENTS

JP           3637897 B2      4/2005
JP       2012-080749 A      4/2012
(Continued)

OTHER PUBLICATIONS

Office action dated Apr. 24, 2018 issued in corresponding JP patent application No. 2017-532303 (and English translation thereof).
(Continued)

*Primary Examiner* — Jorge L Carrasquillo
*Assistant Examiner* — Said Bouziane
(74) *Attorney, Agent, or Firm* — Posz Law Group, PLC

(57) ABSTRACT

A synchronous motor control device includes: a DC power supply; an inverter main circuit; a three-phase synchronous motor; and an inverter control unit that outputs a PWM signal used to control the inverter main circuit. The inverter control unit includes: a PWM signal generation unit; a start-up control unit that outputs a start-up voltage command value to the PWM signal generation unit at the time of start-up; a steady state control unit that calculates a steady state voltage command value in a steady state and outputs the value to the PWM signal generation unit; and a steady state control parameter initial value calculation unit that outputs an initial value of a control parameter to the steady state control unit such that an output voltage vector from the (Continued)

inverter main circuit to the three-phase synchronous motor is consistent before and after switching from the start-up to the steady state.

2 Claims, 6 Drawing Sheets

(51) Int. Cl.
    *H02P 27/08* (2006.01)
    *H02P 21/00* (2016.01)
    *H02P 27/04* (2016.01)
    *H02P 21/26* (2016.01)
    *H02P 21/34* (2016.01)

(52) U.S. Cl.
    CPC .......... *H02P 21/0021* (2013.01); *H02P 27/04* (2013.01); *H02P 27/08* (2013.01); *F25B 2600/021* (2013.01); *F25B 2600/0253* (2013.01); *H02P 21/26* (2016.02); *H02P 21/34* (2016.02)

(56) References Cited

U.S. PATENT DOCUMENTS

| | | | |
|---|---|---|---|
| 2001/0048283 A1 | 12/2001 | Kaitani et al. | |
| 2010/0019714 A1* | 1/2010 | Fuchs | H02P 1/38 318/524 |
| 2013/0106329 A1* | 5/2013 | Kato | H02P 21/18 318/400.11 |
| 2014/0084821 A1 | 3/2014 | Pollock et al. | |
| 2015/0357953 A1* | 12/2015 | Seok | B60L 15/025 318/400.02 |

FOREIGN PATENT DOCUMENTS

| | | |
|---|---|---|
| WO | 2001/15311 A1 | 3/2001 |
| WO | 2012/014443 A1 | 2/2012 |
| WO | 2014-181942 A1 | 11/2014 |

OTHER PUBLICATIONS

International Search Report of the International Searching Authority dated Oct. 27, 2015 for the corresponding international application No. PCT/JP2015/072118 (and English translation).

Office Action corresponding to Australian Patent Application No. 2015404233 dated Jun. 25, 2018.

Extended EP Search Report dated Nov. 13, 2017 issued in corresponding EP patent application No. 15893547.8.

Office Action dated Oct. 30, 2019 issued in corresponding CN patent application No. 201580081618.8 (and partial English translation).

\* cited by examiner

SYNCHRONOUS MOTOR CONTROL DEVICE AND METHOD OF CONTROLLING SYNCHRONOUS MOTOR

CROSS REFERENCE TO RELATED APPLICATION

This application is a U.S. national stage application of International Patent Application No. PCT/JP2015/072118 filed on Aug. 4, 2015, the disclosure of which is incorporated herein by reference.

TECHNICAL FIELD

The present invention relates to a synchronous motor control device that detects and controls a current flowing through a synchronous motor, a compressor driving device, an air conditioner and a method of controlling the synchronous motor.

BACKGROUND

Patent Literature 1 discloses an example of a conventional synchronous motor control device including a current detection unit that detects a current flowing into a synchronous motor, a current coordinate transformation unit that transforms coordinates of the current detected by the synchronous motor into γ-δ axis assumed on a rotor, a compensation term calculation unit that calculates a compensation term on the basis of a correction current command and the coordinate-transformed current, and a voltage command calculation unit that calculates a γ-δ voltage command on the basis of a voltage equation of the synchronous motor in a steady state and the compensation term, where the device feeds a direct current in accordance with the position of a magnetic pole being detected during start-up and estimates a primary resistance of the synchronous motor. According to this technique, a calculation load can be reduced by calculating the voltage command value with use of the voltage equation, while at the same time the primary resistance of the synchronous motor is estimated during start-up to be able to follow a change in coil resistance even under the environment in which there is a large change in temperature as with the synchronous motor mounted in a compressor.

PATENT LITERATURE

Patent Literature 1: WO 01/015311

However, according to the conventional technique described above, a current control unit adjusting the magnitude of a phase current of the synchronous motor is provided only in the period during which the resistance is estimated. This causes a problem that the motor may not start when a large torque is required at the time of start-up due to at least one of the influence of a variation in switching of a switching device that performs PWM control in performing the PWM control, and the influence of a variation in a DC voltage detected in driving the motor by converting the direct current into a three-phase current.

SUMMARY

The present invention has been made in view of the aforementioned problem, where an object of the invention is to provide a synchronous motor control device that enables stable start-up.

In order to solve the aforementioned problem and achieve the object, the synchronous motor control device according to the present invention includes an inverter main circuit, a synchronous motor that is driven when a direct current of a DC power supply is converted into an alternating current by the inverter main circuit, and an inverter control unit that receives as input an angular velocity command value, a phase current value of the synchronous motor and a DC voltage value of the DC power supply and outputs a PWM signal used to control the inverter main circuit. The inverter control unit includes a PWM signal generation unit, a start-up control unit that outputs a start-up voltage command value corresponding to the phase current value to the PWM signal generation unit at the time of start-up, a steady state control unit that calculates a steady state voltage command value by using a voltage equation and outputs the value to the PWM signal generation unit in a steady state, and a steady state control parameter initial value calculation unit that outputs an initial value of a control parameter used in the steady state control unit to the steady state control unit such that an output voltage vector from the inverter main circuit to the synchronous motor is consistent before and after switching from the start-up to the steady state.

The synchronous motor control device according to the present invention enables stable start-up.

DETAILED DESCRIPTION

A synchronous motor control device, a compressor driving device, an air conditioner and a method of controlling a synchronous motor according to exemplary embodiments of the present invention will now be described in detail with reference to the drawings. Note that the present invention is not to be limited by the embodiments.

First Embodiment

Figure 1:
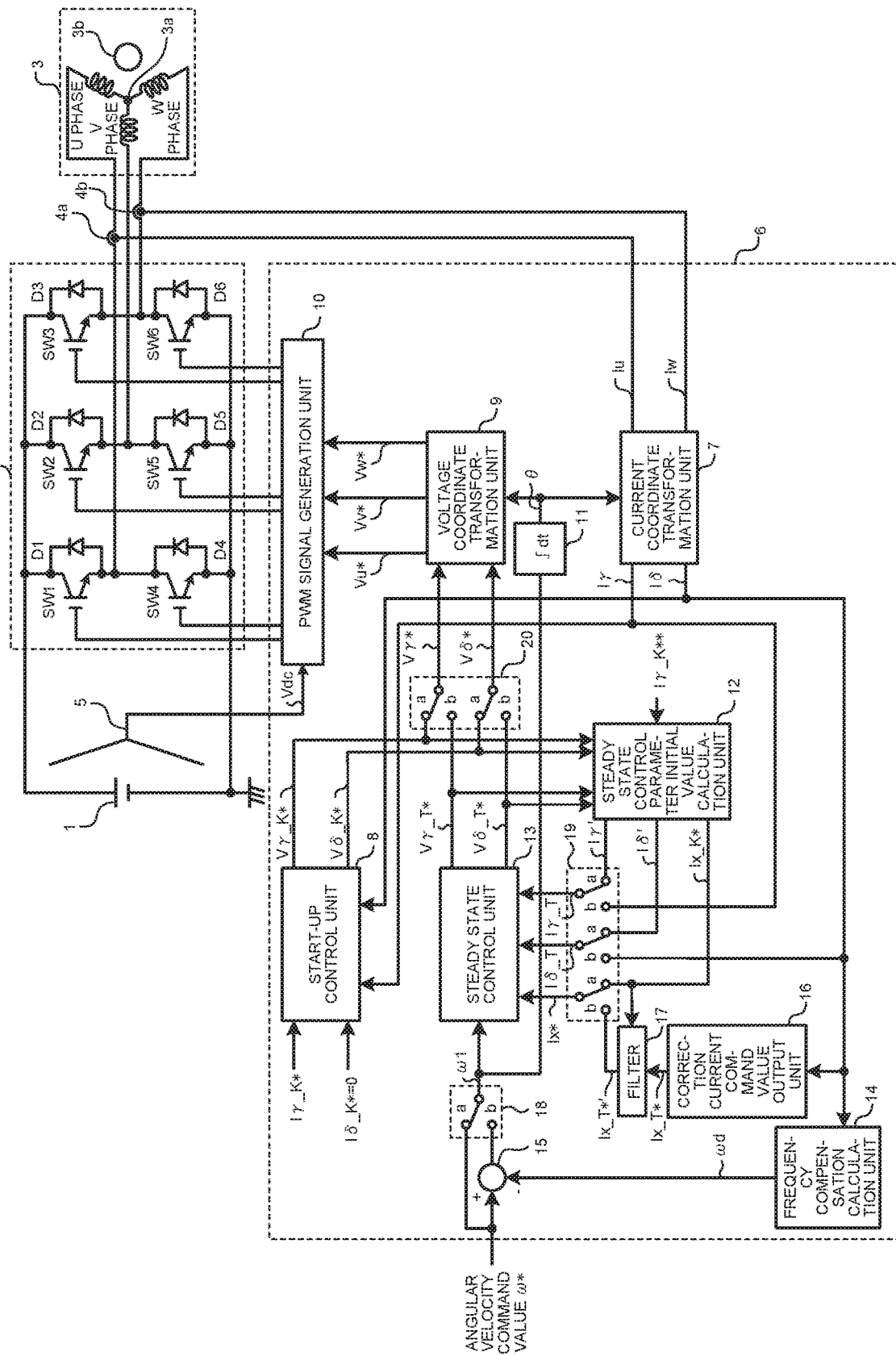
FIG. 1 is a block diagram illustrating the configuration of a synchronous motor control device according to a first embodiment.

FIG. 1 is a block diagram illustrating the configuration of a synchronous motor control device according to a first embodiment of the present invention. As illustrated in FIG. 1, the synchronous motor control device of the first embodiment includes an inverter main circuit 2 that is connected to a DC power supply 1 and formed of a plurality of switching devices, a three-phase synchronous motor 3 that is driven by AC power output from the inverter main circuit 2, current detectors 4a and 4b that detect a phase current value of the three-phase synchronous motor 3, a voltage detector 5 that detects a DC voltage value of the DC power supply 1, and an inverter control unit 6 that receives an angular velocity command value, the phase current value detected by the current detectors 4a and 4b and the DC voltage value detected by the voltage detector 5 to generate an PWM signal used in controlling switching on and off of the plurality of switching devices of the inverter main circuit 2 and output the signal to the inverter main circuit 2. The inverter main circuit 2 connected to the DC power supply 1 in FIG. 1 includes power switching devices SW1, SW2, SW3, SW4, SW5, and SW6, diodes D1, D2, D3, D4, D5 and D6 connected in anti-parallel with the power switching devices SW1, SW2, SW3, SW4, SW5, and SW6, and a drive circuit (not illustrated) for the power switching devices SW1, SW2, SW3, SW4, SW5, and SW6 to convert a direct current from the DC power supply 1 into an alternating current and drive the three-phase synchronous motor 3. The inverter main circuit 2 is formed of an IPM (Intelligent Power Module), for example. The three-phase synchronous motor 3 includes a three-phase, Y-connected stator 3a having U, V and W phases and a permanent magnet rotor 3b. While each of the power switching devices SW1, SW2, SW3, SW4, SW5, and SW6 is formed of an IGBT (Insulated Gate Bipolar Transistor) in FIG. 1, the present invention is not limited to such configuration. The DC power supply 1 may be generated by rectifying and smoothing AC power supply, for example. Note that while the three-phase synchronous motor is illustrated as the synchronous motor, the present invention is not limited to such configuration.

The current detector 4a detects a U-phase current Iu flowing into the three-phase synchronous motor 3, while the current detector 4b detects a W-phase current Iw flowing into the three-phase synchronous motor 3. The voltage detector 5 detects voltage across the DC power supply 1. Note that while the U-phase current and the W-phase current are detected according to the configuration in FIG. 1, the present invention is not limited to such configuration but may be adapted to detect the U-phase current Iu and a V-phase current Iv, the V-phase current Iv and the W-phase current Iw, or the currents in all three phases. Alternatively, the current flowing into the DC power supply 1 may be detected to detect a two phase current. When the current flowing into the DC power supply 1 is detected to detect the two phase current, there are provided a current detection unit that detects a current through a DC bus of the inverter main circuit and a phase determination unit that determines which phase the current value detected by the current detection unit corresponds to on the basis of a switching mode of the inverter main circuit when the current is detected, where it is configured such that a time during which a switching mode corresponding to any basic voltage vector other than a zero vector is held is longer than a sum of a dead time of the inverter main circuit and the time required for the current detection unit to detect the current. Japanese Patent Application Laid-Open No. H3-230767 discloses an example of such technology.

The inverter control unit 6 generates and outputs the PWM signal that drives the power switching devices SW1, SW2, SW3, SW4, SW5, and SW6 of the inverter main circuit 2 by using an angular velocity command value ω* input from the outside, the U-phase current Iu detected by the current detector 4a, the W-phase current Iw detected by the current detector 4b, and a DC voltage Vdc detected by the voltage detector 5. The inverter control unit 6 can be implemented by a microprocessor, for example.

The inverter control unit 6 adapted to operate in a "start-up control mode" or a "steady state control mode" operates in the "start-up control mode" at the start of inverter control. Note that in the following description, "on start-up" refers to a time when the control unit operates in the "start-up control mode", and "in a steady state" refers to a time when the control unit operates in the "steady state control mode". Moreover, "on start-up" is also referred to as "in start-up control", while "in the steady state" is also referred to as "in steady state control". Switches 18, 19 and 20 are all connected to an a terminal side on start-up and to a b terminal side in the steady state. A start-up control unit 8 and a steady state control parameter initial value calculation unit 12 operate only on start-up. There will now be described the case in which the inverter control unit 6 operates in the "start-up control mode".

On the basis of a phase θ to be described, a current coordinate transformation unit 7 receives the U-phase current Iu and the W-phase current Iw as input to transform these values into values on a γ-δ axis being a control axis of a rotating reference frame, and then outputs a γ-axis current Iγ and a δ-axis current Iδ. Where the control axis used in start-up control based on a voltage command value output from the start-up control unit 8 is defined as a "γ_K-δ_K axis" and the control axis used in steady state control based on a voltage command value output from a steady state control unit 13 is defined as a "γ_T-δ_T axis", the output values of the γ-axis current Iγ and the δ-axis current Iδ are values on the "γ_K-δ_K axis" in the start-up control and on the "γ_T-δ_T axis" in the steady state control since the phase θ is corrected at the time of a shift from the start-up control to the steady state control, as will be described later.

The start-up control unit 8 performing current control calculates and outputs a start-up γ-axis voltage command value Vγ_K* and a start-up δ-axis voltage command value Vδ_K* such that the γ-axis current Iγ and the δ-axis current Iδ correspond with a start-up γ-axis current command value Iγ_K* and a start-up δ-axis current command value Iδ_K* given in advance for the start-up control, respectively. The start-up control unit 8 is implemented by PI control. The switch 20 is connected to the a terminal in the "start-up control mode", whereby "Vγ*=Vγ_K*" and "Vδ*=Vδ_K*" are selected.

A voltage coordinate transformation unit 9 receives the γ-axis voltage command value Vγ*, the δ-axis voltage command value Vδ* and the phase θ as input to convert the γ-axis voltage command value Vγ* and the δ-axis voltage command value Vδ* into three-phase voltage command values Vu*, Vv* and Vw* on the basis of the phase θ and then output the three-phase voltage command values. A PWM signal generation unit 10 receives the three-phase voltage command values Vu*, Vv* and Vw* and the DC voltage Vdc as input to generate and output the PWM signal that drives the power switching devices SW1, SW2, SW3, SW4, SW5 and SW6. An integrator 11 receives primary angular velocity ω1 as input to integrate the primary angular velocity ω1 and output the phase θ. The phase θ is then input to the current coordinate transformation unit 7 and the voltage coordinate transformation unit 9. The switch 18 is connected to the a terminal in the "start-up control mode", whereby the angular velocity equals ω* (ω1=ω*).

The steady state control parameter initial value calculation unit 12 calculates and outputs an initial value of a correction current command value Ix* being a control parameter of the steady state control unit 13 to be described such that output voltage vectors correspond before and after the shift from the "start-up control mode" to the "steady state control mode". The steady state control parameter initial value calculation unit 12 receives the start-up γ-axis voltage command value Vγ_K* and the start-up δ-axis voltage command value Vδ_K* output from the start-up control unit 8, a steady state γ-axis voltage command value Vγ_T* and a steady state δ-axis voltage command value Vδ_T* output from the steady state control unit 13 and a start-up γ-axis current command target value Iγ_K** given in advance for the start-up control as input to calculate and output a γ-axis current Iγ' and a δ-axis current Iδ' on the "γ_T-δ_T axis" as well as a start-up correction current command value Ix_K* that is used in the "start-up control mode". The switch 19 is connected to the a terminal in the "start-up control mode", whereby "Iγ_T=Iγ'", "Iδ_T=Iδ'" and "Ix*=Ix_K*" are selected. The switch 19 is connected to the b terminal in the "steady state control mode", whereby "Iγ_T=Iγ", "Iδ_T=Iδ" and "Ix*=Ix_T*'" are selected. Here, Iγ_T and Iδ_T are the γ-axis current and the δ-axis current used by the steady state control unit 13, respectively.

The steady state control unit 13 calculates and outputs the steady state γ-axis voltage command value Vγ_T* and the steady state δ-axis voltage command value Vδ_T*. Here, the steady state γ-axis voltage command value Vγ_T* and the steady state δ-axis voltage command value Vδ_T* are calculated from a voltage equation in expression (1). The voltage equation is obtained by adding a compensation term Icmp multiplied by a gain to a voltage equation of the three-phase synchronous motor 3 in the steady state.

[Expression 1]

$$\begin{bmatrix} V\gamma\_T* \\ V\delta\_T* \end{bmatrix} = \begin{bmatrix} Ra & -\omega 1 \cdot Lq \\ \omega 1 \cdot Ld & Ra \end{bmatrix} \begin{bmatrix} I\gamma\_T \\ I\delta\_T \end{bmatrix} + \begin{bmatrix} 0 \\ \omega 1 \cdot \phi f \end{bmatrix} + \begin{bmatrix} K\gamma \\ K\delta \end{bmatrix} \cdot Icmp \quad (1)$$

The compensation term Icmp is expressed by expression (2).

[Expression 2]

$$Icmp = Ix* - I\gamma T + Kcmp \cdot I\delta\_T^2 \quad (2)$$

Note that a phase resistance Ra, a d-axis inductance Ld, a q-axis inductance Lq and an induced voltage constant φf are motor parameters, while Kγ, Kδ, and Kcmp are gains being set. When the gains are too large, the output voltage vectors cannot be controlled to correspond in the start-up control and on the steady state control, whereby it may be required that the gains be provided separately for the start-up control and the steady state control to be able to be switched therebetween.

Next, there will be described the case in which the inverter control unit 6 operates in the "steady state control mode".

A frequency compensation calculation unit 14 receives the δ-axis current Iδ as input to calculate and output angular velocity compensation ωd. A subtractor 15 receives the angular velocity command value ω* and the angular velocity compensation ωd as input to subtract the angular velocity compensation ωd from the angular velocity command value ω* and output the outcome. The switch 18 is connected to the b terminal when the inverter control unit 6 is in the "steady state control mode", whereby the output of the subtractor 15 is selected as the primary angular velocity ω1. A correction current command value output unit 16 receives the δ-axis current Iδ as input to output a steady state correction current command value Ix_T* used in the "steady state control mode". The correction current command value output unit 16 stores in advance the steady state correction current command value Ix_T* for the δ-axis current Iδ as a data table and refers to the data table to output the steady state correction current command value Ix_T* corresponding to the δ-axis current Iδ being received, for example. A filter 17 receives the steady state correction current command value Ix_T* and the start-up correction current command value Ix_K* as input to output a value Ix_T*' obtained by multiplying the output of the correction current command value output unit 16 by a first order lag filter. Here, the start-up correction current command value Ix_K* calculated in the steady state control parameter initial value calculation unit 12 is used as an initial value of the value Ix_T*' being the output of the filter 17.

Figure 2:
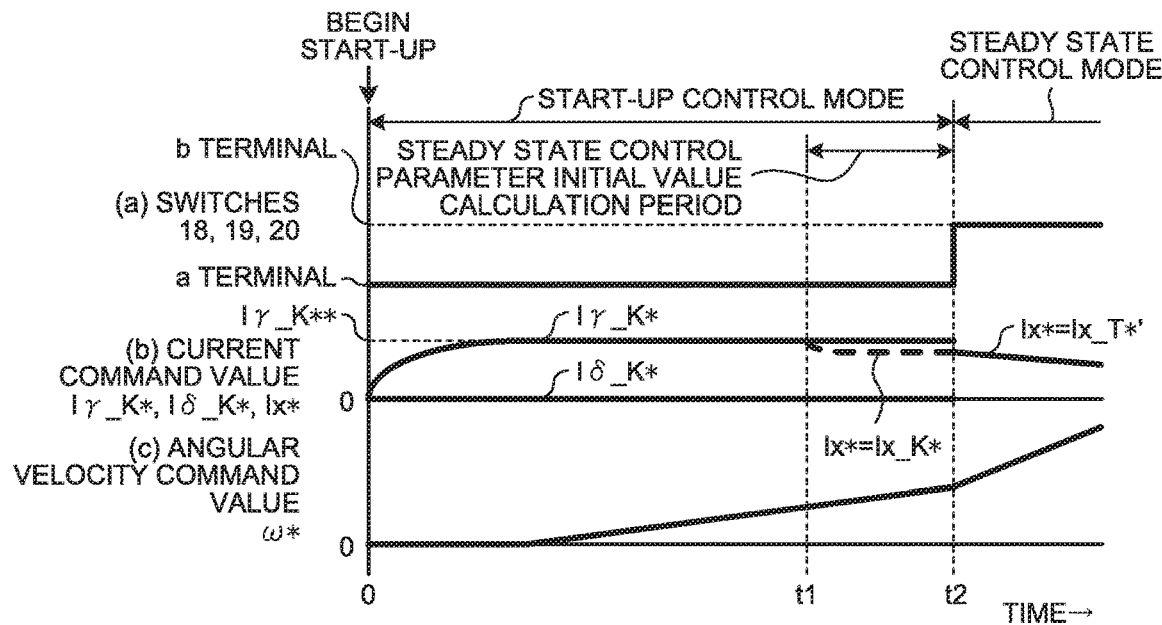
FIG. 2 is a timing chart from start-up to a steady state according to the first embodiment.

FIG. 2 is a timing chart from the start-up to the steady state according to the first embodiment. In FIG. 2, (a) indicates whether the terminal position of the switches 18, 19 and 20 is on the a terminal side or the b terminal side, (b) indicates the start-up γ-axis current command value Iγ_K* and the start-up δ-axis current command value Iδ_K* input to the start-up control unit 8 as well as the correction current command value Ix* input to the steady state control unit 13, and (c) indicates the angular velocity command value ω*.

In the "start-up control mode" from a start-up starting point at which the three-phase synchronous motor 3 starts to be driven to time t2, the switches 18, 19 and 20 are all connected to the a terminal so that the start-up control is performed by using the start-up γ-axis voltage command value Vγ_K* and the start-up δ-axis voltage command value Vδ_K* output from the start-up control unit 8 whereas, in the "steady state control mode" from time t2 onward, the switches 18, 19 and 20 are all connected to the b terminal so that the steady state control is performed by using the steady state γ-axis voltage command value Vγ_T* and the steady state δ-axis voltage command value Vδ_T* output from the steady state control unit 13.

The start-up γ-axis current command value Iγ_K* input to the start-up control unit 8 is set to approach the start-up γ-axis current command target value Iγ_K from 0 [A] by applying the first order lag with a filter time constant of 100 ms, for example. Here, the start-up γ-axis current command target value Iγ_K is set to a value with which the phase current ensuring a starting torque required of the three-phase synchronous motor 3 can be fed. The start-up δ-axis current command value Iδ_K* is fixed at 0 [A]. A root mean square of the phase current of the three-phase synchronous motor 3 is controlled to converge to "Iγ_K*/√3". The angular velocity command value ω* stays at 0 [rad/s] from the start of the start-up until the start-up γ-axis current command value Iγ_K* converges to the start-up γ-axis current command target value Iγ_K** and accelerates until time t2 at an acceleration rate specific to the "start-up control mode" in order to ensure synchronization after the converging, the acceleration rate being slower than that in the "steady state control mode".

In a period from time t1 to time t2 corresponding to a later stage of the "start-up control mode", namely in a steady state control parameter initial value calculation period indicated in FIG. 2, the steady state control parameter initial value calculation unit 12 and the steady state control unit 13 are operated to perform an adjustment that prevents a change in the output voltage vector when the switches 18, 19 and 20 shift from the a terminal side to the b terminal side. The start-up correction current command value Ix_K* output from the steady state control parameter initial value calculation unit 12 is selected as the correction current command value Ix* in the steady state control parameter initial value calculation period and, in the "steady state control mode" from time t2 onward, the value Ix_T*' being the output of the filter 17 is selected as the correction current command value. It is assumed "Ix_T*'=Ix_K*" at time t2. Time t1 is set such that the γ-axis current Iγ and the δ-axis current Iδ being the output of the current coordinate transformation unit 7 surely converge to the start-up γ-axis current command value Iγ_K* and the start-up δ-axis current command value Iδ_K*, respectively.

While the start-up control is started without estimating the position of a magnetic pole of the permanent magnet rotor 3b at halt in FIG. 2, it is preferred to start the start-up control after estimating the position of the magnetic pole for a use in which the three-phase synchronous motor 3 cannot be rotated in a reverse direction.

Figure 3:
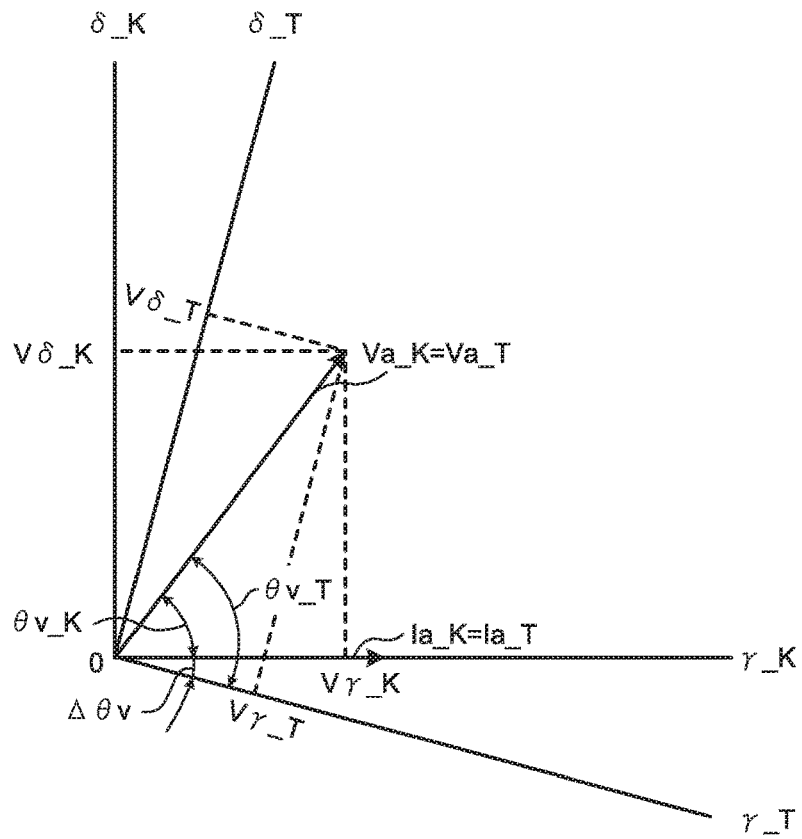
FIG. 3 is a diagram illustrating an output voltage vector and a current vector that are consistent at the start-up and in the steady state in the first embodiment.

FIG. 3 is a diagram illustrating the output voltage vector and a current vector that are consistent at the start-up and in the steady state in the first embodiment. That is, FIG. 3 illustrates a vector diagram in which a start-up output voltage vector Va_K corresponds with a steady state output voltage vector Va_T while at the same time a start-up current vector Ia_K corresponds with a steady state current vector Ia_T. In other words, FIG. 3 illustrates the vector diagram in which Va_K=Va_T and Ia_K=Ia_T. The "γ_K-δ_K axis" and the "γ_T-δ_T axis" do not correspond when the three-phase synchronous motor 3 is under a load not illustrated, whereby an axial error Δθv occurs. When Va_K=Va_T, the axial error Δθv can be expressed as a difference between a steady state voltage phase θv_T and a start-up voltage phase θv_K, the steady state voltage phase being an angle formed by the steady state γ-axis voltage command value Vγ_T* and the steady state δ-axis voltage command value Vδ_T*, and the start-up voltage phase being an angle formed by the start-up γ-axis voltage command value Vγ_K* and the start-up δ-axis voltage command value Vδ_K*.

Figure 4:
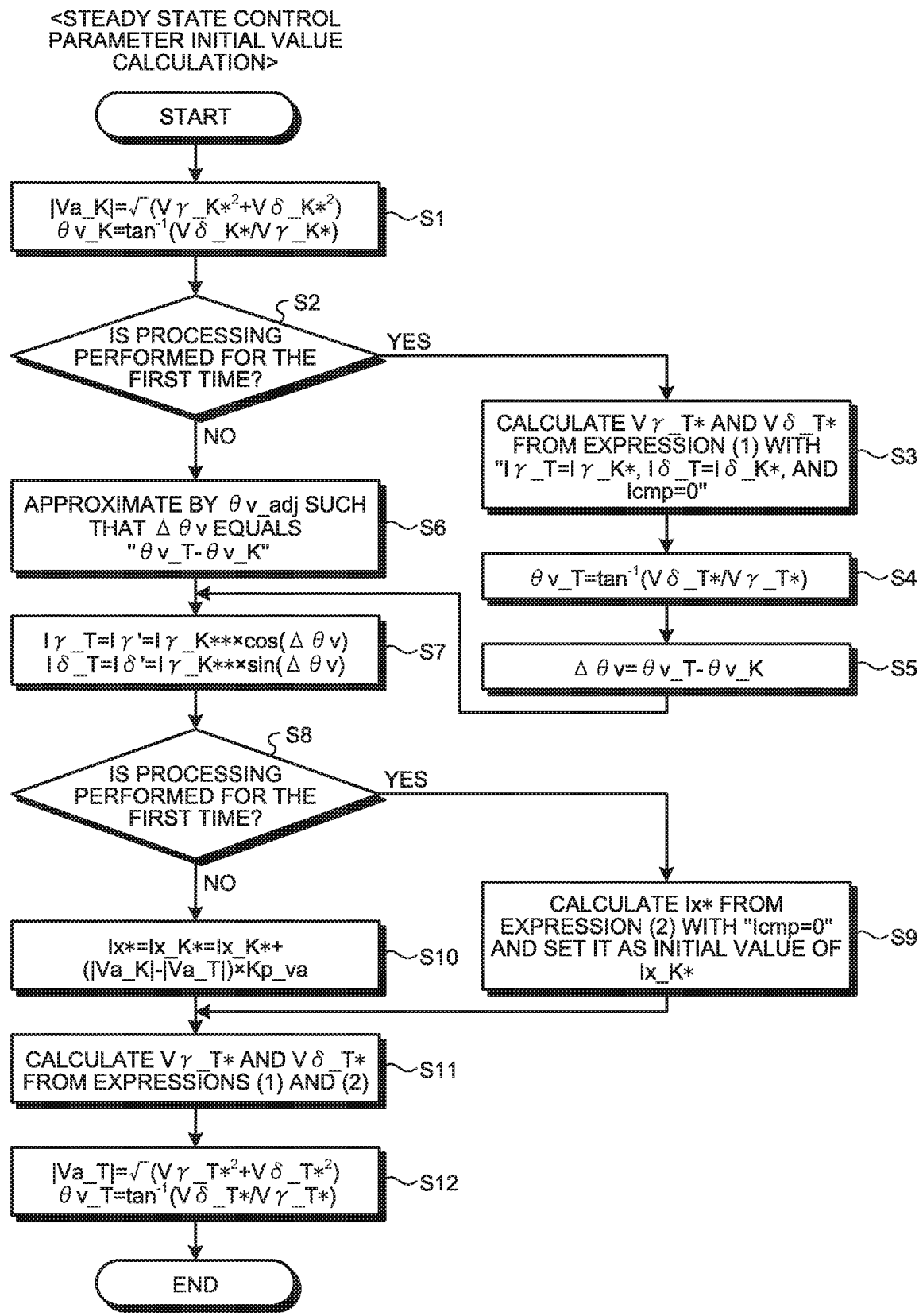
FIG. 4 is a flowchart illustrating an operation of a steady state control parameter initial value calculation unit according to the first embodiment.

FIG. 4 is a flowchart illustrating an operation of the steady state control parameter initial value calculation unit 12 according to the first embodiment. The processing in the flowchart illustrated in FIG. 4 is repeated in every control cycle of the inverter control unit 6 such as every carrier cycle of the PWM signal during the period from time t1 to time t2. After the processing is started, magnitude |Va_K| of the start-up output voltage vector and the start-up voltage phase θv_K are calculated from the start-up γ-axis voltage command value Vγ_K* and the start-up δ-axis voltage command value Vδ_K* (S1). Next, it is determined whether or not the processing is performed for the first time (S2) and, when the processing is performed for the first time (S2: Yes), processings from S3 to S5 are performed on the assumption that the "γ_K-δ_K axis" and the "γ_T-δ_T axis" correspond. This can reduce the time it takes for the start-up output voltage vector Va_K and the steady state output voltage vector Va_T to correspond with each other. Now, with Iγ T=Iγ_K*, Iδ_T=Iδ_K* and Icmp=0, the steady state γ-axis voltage command value Vγ_T* and the steady state δ-axis voltage command value Vδ_T* are calculated from expression (1) above (S3). The steady state γ-axis voltage command value Vγ_T* and the steady state δ-axis voltage command value Vδ_T* calculated in S3 are then used to calculate the steady state voltage phase θv_T (S4). The difference between the steady state voltage phase θv_T calculated in S4 and the start-up voltage phase θv_K calculated in S1 is calculated to be set as an initial value of the axial error Δθv (S5). When it is not the first time the flow processing is performed (S2: No), namely when it is at least the second time the processing is performed, an adjustment is made by an adjustment phase θv_adj such as by 0.1 degrees such that the axial error Δθv equals "θv_T-θv_K" being the difference between the steady state voltage phase θv_T and the start-up voltage phase θv_K. The adjustment phase θv_adj is used to perform the approximation in every control cycle instead of letting the axial error Δθv=θv_T-θv_K in order to prevent hunting of a current value found in S7 and for the steady state output voltage vector Va_T to surely converge to the start-up output voltage vector Va_K.

Next, the γ-axis current Iγ' and the δ-axis current Iδ' on the "γ_T-δ_T axis" are calculated on the basis of the axial error Δθv found in S5 or S6 (S7). Here, a steady state γ-axis current Iγ_T and a steady state δ-axis current Iδ_T are calculated with the magnitude of the current vector |Ia| being the start-up γ-axis current command target value Iγ_K** on the assumption that the γ-axis current Iγ and the δ-axis current Iδ that are the output of the current coordinate transformation unit 7 converge to the start-up γ-axis current command value Iγ_K* and the start-up δ-axis current command value Iδ_K*, respectively (S7). The flow processing is performed during the period from time t1 to time t2, so that "Iγ_T=Iγ' and Iδ_T=Iδ'".

Next, it is determined once again whether or not the flow processing is performed for the first time (S8) and, when the flow processing is performed for the first time (S8: Yes), the correction current command value Ix* is calculated from expression (2) with the compensation term Icmp=0 and set as an initial value of the start-up correction current command value Ix_K* (S9). When it is not the first time the flow processing is performed (S8: No), namely when it is at least the second time the processing is performed, the start-up correction current command value Ix_K* is calculated by PI control on a proportional gain Kp_va such that the magnitude |Va_K| of the start-up output voltage vector Va_K and the magnitude |Va_T| of the steady state output voltage vector Va_T approach each other in every control cycle and correspond with each other (S10). The processing is performed during the period from time t1 to time t2, whereby Ix*=Ix_K*.

Next, the steady state γ-axis current Iγ T and the steady state δ-axis current Iδ_T calculated in S7 as well as the correction current command value Ix* calculated in S9 or S10 are substituted into expressions (1) and (2) to calculate the steady state γ-axis voltage command value Vγ_T* and the steady state δ-axis voltage command value Vδ_T* (S11). The steady state γ-axis voltage command value Vγ_T* and the steady state δ-axis voltage command value Vδ_T* calculated in S11 are then used to calculate the magnitude |Va_T| of the steady state output voltage vector and the steady state voltage phase θv_T (S12). The start-up output voltage vector Va_K and the steady state output voltage vector Va_T correspond with each other as the processing is repeated during the period from time t1 to time t2 so that, when the switches 18, 19 and 20 are switched from the a terminal side to the b terminal side, the mode can be shifted with no change in the output voltage vector Va by setting the start-up correction current command value Ix_K* as the initial value of the value Ix_T*' being the output of the filter 17 while at the same time correcting the phase θ being the output of the integrator 11 by the amount corresponding to the axial error Δθ.

Therefore, by calculating the voltage command value with use of the voltage equation without the current control unit in the steady state, the torque required at the time of start-up can be ensured while achieving stable start-up performance with no change in the output voltage at the time of the shift from the start-up to the steady state.

The voltage command value is calculated by using the current command value at the time of start-up and by using the voltage equation in the steady state, thereby making a start-up setting easy and requiring less calculation. Moreover, the phase current ensuring the start-up torque required at the time of start-up can be fed, so that the device is applicable to one such as a compressor that requires a large torque at the time of start-up depending on the state of a refrigerant as a load of the three-phase synchronous motor. Furthermore, when the initial value of the control parameter used in the steady state control is calculated such that the output voltage vector at the start-up corresponds with the output voltage vector in the steady state, the magnitude and phase of the output voltage vector in the steady state is adjusted by repetitive calculation in every control cycle, whereby the output voltage vector in the steady state can converge to the output voltage vector at the start-up even when the current detector and the voltage detector give false detection due to noise. Yet furthermore, the mode can be switched from the start-up control to the steady state control during acceleration without making the rotational speed of the three-phase synchronous motor constant, thereby reducing as much as possible the influence of a resonance point that can occur in a low-speed region.

Second Embodiment

While the steady state control unit 13 of the first embodiment calculates the voltage command value by adding the compensation term Icmp multiplied by the gain to the voltage equation of the three-phase synchronous motor 3 in the steady state, a second embodiment describes a mode in which a steady state control unit employs primary magnetic flux control.

Figure 5:
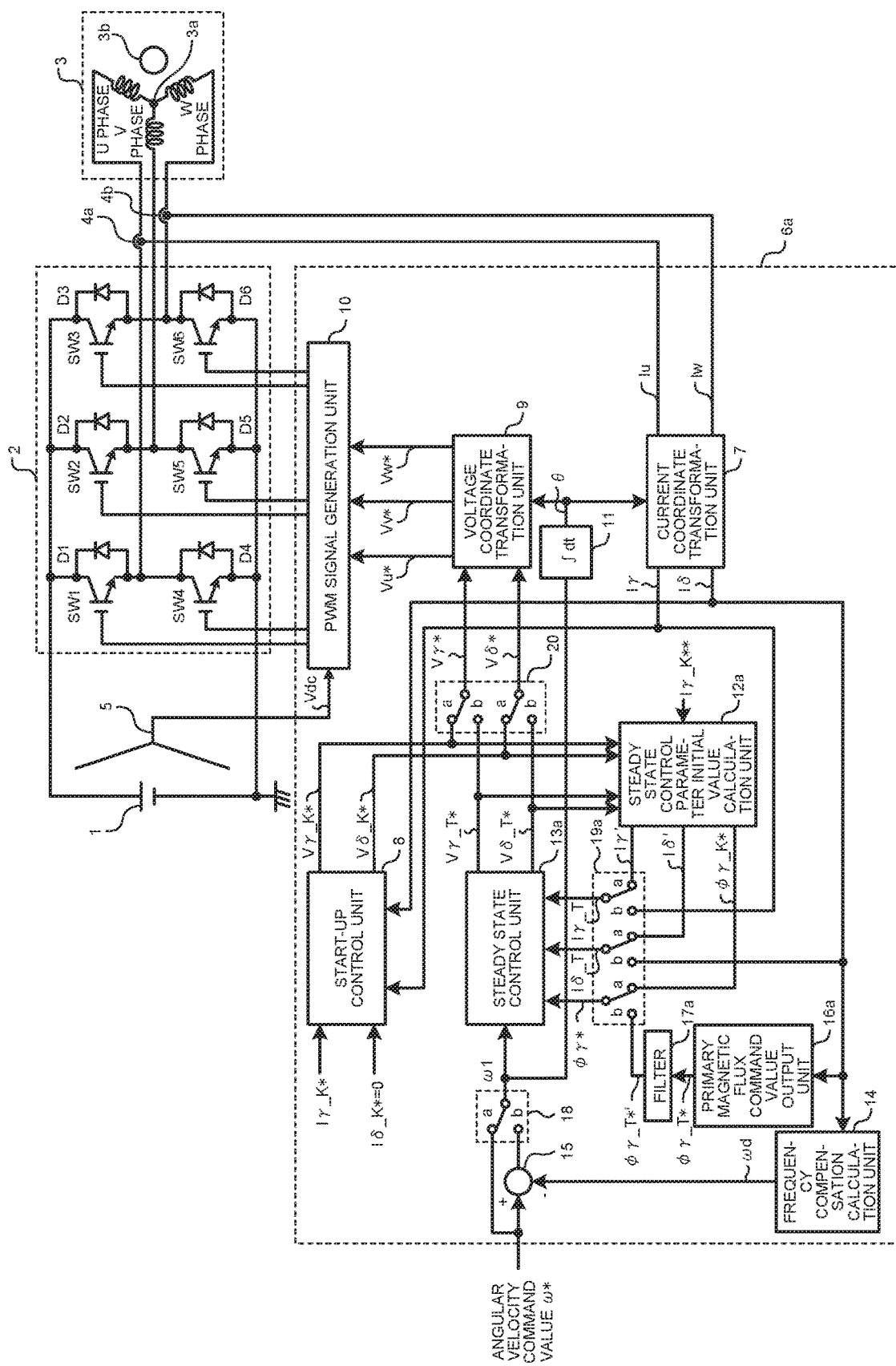
FIG. 5 is a block diagram illustrating the configuration of a synchronous motor control device according to a second embodiment.

FIG. 5 is a block diagram illustrating the configuration of a synchronous motor control device according to the second embodiment of the present invention. In the second embodiment, a configuration equivalent to that of the first embodiment will be assigned the same reference numeral as that assigned thereto and will not be described. There will be described a steady state control parameter initial value calculation unit 12a, a steady state control unit 13a, a primary magnetic flux command value output unit 16a, a filter 17a and a switch 19a included in an inverter control unit 6a being the configuration assigned with a reference numeral different from that assigned to the first embodiment.

The steady state control parameter initial value calculation unit 12a calculates and outputs an initial value of a primary magnetic flux command value φγ* being a control parameter in the primary magnetic flux control performed by the steady state control unit 13a to be described such that output voltage vectors correspond before and after the shift from a "start-up control mode" to a "steady state control mode". The steady state control parameter initial value calculation unit 12a receives a start-up γ-axis voltage command value Vγ_K* and a start-up δ-axis voltage command value Vδ_K* output from a start-up control unit 8, a steady state γ-axis voltage command value Vγ_T* and a steady state δ-axis voltage command value Vδ_T* output from the steady state control unit 13a and a start-up γ-axis current command target value Iγ_K** given in advance for the start-up control as input to calculate and output a γ-axis current Iγ' and a δ-axis current Iδ' on a "γ_T-δ_T axis" as well as a start-up primary magnetic flux command value φγ_K* that is used in the "start-up control mode". The switch 19a is connected to an a terminal in the "start-up control mode", whereby "Iγ_T=Iγ'", "Iδ_T=Iδ'" and "φγ*=φγ_K*" are selected. The switch 19a is connected to a b terminal in the "steady state control mode", whereby "Iγ_T=Iγ", "Iδ_T=Iδ" and "φγ*=φγ_T*'" are selected.

The steady state control unit 13a performs the primary magnetic flux control to calculate and output the steady state γ-axis voltage command value Vγ_T* and the steady state δ-axis voltage command value Vδ_T*. Here, the steady state γ-axis voltage command value Vγ_T* and the steady state δ-axis voltage command value Vδ_T* are calculated on the basis of a voltage equation in expression (3) according to the primary magnetic flux control.

[Expression 3]

$$\begin{bmatrix} V\gamma\_T* \\ V\delta\_T* \end{bmatrix} = \begin{bmatrix} Ra & 0 \\ 0 & Ra \end{bmatrix}\begin{bmatrix} I\gamma\_T \\ I\delta\_T \end{bmatrix} + \begin{bmatrix} 0 \\ \omega 1 \cdot \phi\gamma* \end{bmatrix} + \begin{bmatrix} K\gamma' \\ K\delta' \end{bmatrix} \cdot \phi err \quad (3)$$

Note that φerr is expressed by expression (4).

[Expression 4]

$$\phi err = \phi\gamma* - Ld \cdot I\gamma\_T - \phi f \cdot \sqrt{1 - \left(\frac{Lq \cdot I\delta\_T}{\phi f}\right)^2} \quad (4)$$

Here, a phase resistance Ra, a d-axis inductance Ld, a q-axis inductance Lq and an induced voltage constant φf are motor parameters, while Kγ' and Kδ' are gains being set. When the gains are too large, the output voltage vectors cannot be controlled to correspond at the start-up and in the steady state, whereby it may be required that the gains be provided separately for the start-up control and the steady state control to be able to be switched therebetween.

The primary magnetic flux command value output unit 16a receives the δ-axis current Iδ as input to output a steady state primary magnetic flux command value φγ_T* used in the "steady state control mode". The steady state primary magnetic flux command value φγ_T* for the δ-axis current Iδ is stored in advance as a data table in the primary magnetic flux command value output unit 16a, which refers to the data table to output the steady state primary magnetic flux command value φγ_T* corresponding to the δ-axis current Iδ being received, for example. The filter 17a outputs a value φγ_T*' obtained by multiplying the output of the primary magnetic flux command value output unit 16a by a first order lag filter. Here, it is assumed that the start-up primary magnetic flux command value φγ_K* calculated in the steady state control parameter initial value calculation unit 12a is used as an initial value of the value φγ_T*' being the output of the filter 17a.

Figure 6:
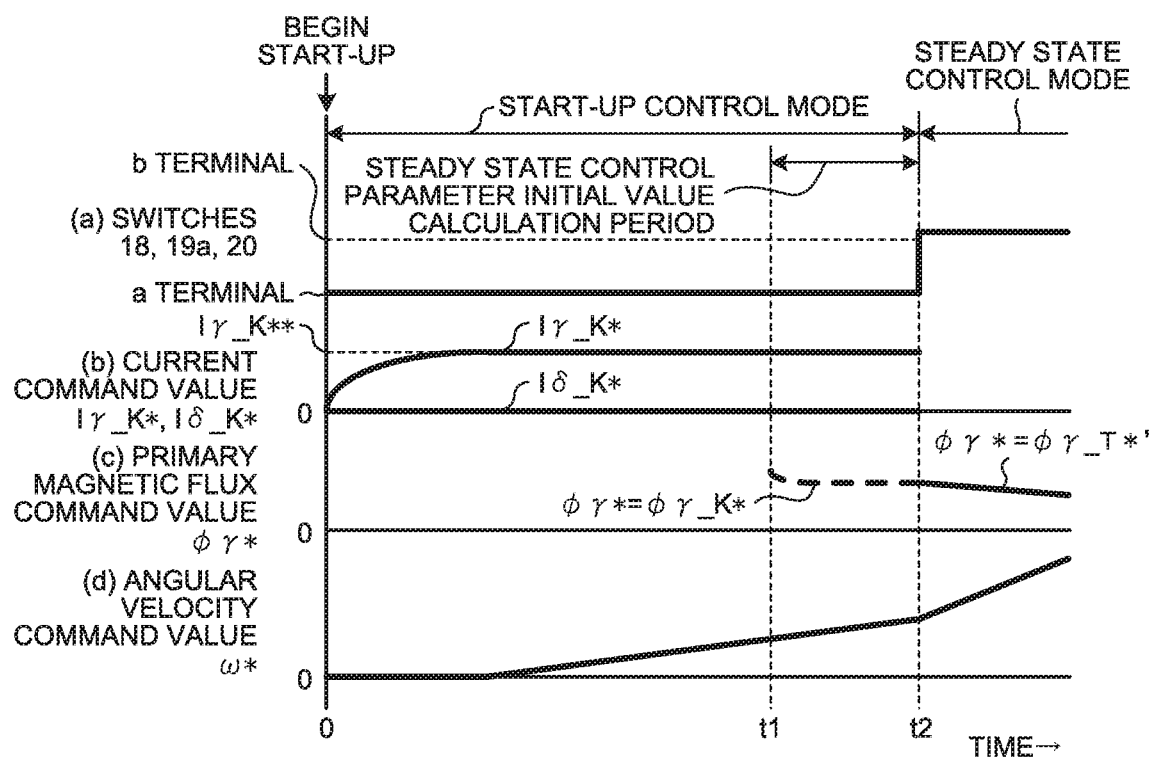
FIG. 6 is a timing chart from start-up to a steady state according to the second embodiment.

FIG. 6 is a timing chart from the start-up to the steady state according to the second embodiment. In FIG. 6, (a) indicates whether the terminal position of the switches 18, 19a and 20 is on the a terminal side or the b terminal side, (b) indicates the start-up γ-axis current command value Iγ_K* and the start-up δ-axis current command value Iδ_K* input to the start-up control unit 8, (c) indicates the primary magnetic flux command value φγ* input to the steady state control unit 13a, and (d) indicates an angular velocity command value ω*. Here, the operation except for (c) is similar to that of the first embodiment and thus will not be described.

In a period from time t1 to time t2 corresponding to a later stage of the "start-up control mode", namely in a steady state control parameter initial value calculation period indicated in FIG. 6, the steady state control parameter initial value calculation unit 12a and the steady state control unit 13a are operated to perform an adjustment that prevents a change in the output voltage vector when the switches 18, 19a and 20 shift from the a terminal side to the b terminal side. The start-up primary magnetic flux command value φγ_K* output from the steady state control parameter initial value calculation unit 12a is selected as the primary magnetic flux command value φγ* in the steady state control parameter initial value calculation period and, in the "steady state control mode" from time t2 onward, the value φγ_T*' being the output of the filter 17a is selected as the primary magnetic flux command value. It is assumed "φγ_T*'=φγ_K*'" at time t2.

Figure 7:
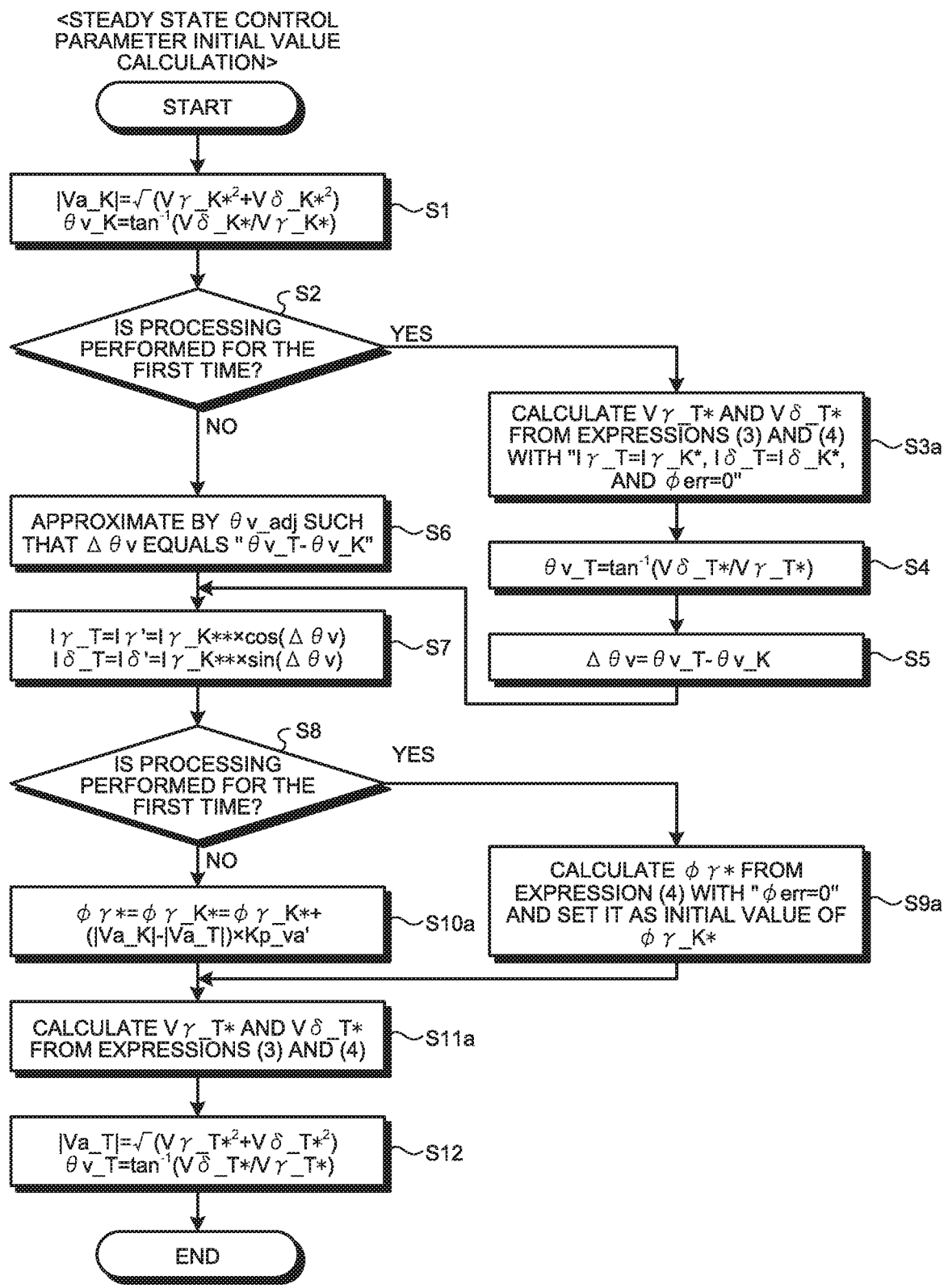
FIG. 7 is a flowchart illustrating an operation of a steady state control parameter initial value calculation unit according to the second embodiment.

FIG. 7 is a flowchart illustrating an operation of the steady state control parameter initial value calculation unit 12a according to the second embodiment. The flow processing illustrated in FIG. 7 is repeated in every control cycle of the inverter control unit 6a such as every carrier cycle of a PWM signal during the period from time t1 to time t2. In FIG. 7, processings except for S3a, S9a, S10a, and S11a are similar to those in FIG. 4 of the first embodiment to thus be assigned the same reference numerals as those assigned in FIG. 4 and will not be described.

In S3a, on the assumption that the "γ_K-δ_K axis" and the "γ_T-δ_T axis" correspond with each other, the steady state γ-axis voltage command value Vγ_T* and the steady state δ-axis voltage command value Vδ_T* are calculated from expressions (3) and (4) with Iγ_T=Iγ_K*, Iδ_T=Iδ_K*, and φerr=0. In S9a, with φerr=0, the primary magnetic flux command value φγ* is calculated by using expression (4) to be set as an initial value of the start-up primary magnetic flux command value φγ_K*. In S10a, the start-up primary magnetic flux command value φγ_K* is calculated by PI control on a proportional gain Kp_va' such that the magnitude |Va_K| of a start-up output voltage vector Va_K and the magnitude |Va_T| of a steady state output voltage vector Va_T approach each other in every control cycle and correspond with each other. The flow processing is performed during the period from time t1 to time t2, whereby φγ*=φγ_K*. In S11a, the steady state γ-axis current Iγ_T and the steady state δ-axis current Iδ_T' calculated in S7 as well as the primary magnetic flux command value φγ* calculated in S9a or S10a are substituted into expressions (3) and (4) to calculate the steady state γ-axis voltage command value Vγ_T* and the steady state δ-axis voltage command value Vδ_T*.

The start-up output voltage vector Va_K and the steady state output voltage vector Va_T correspond with each other as the processing is repeated during the period from time t1 to time t2 so that, when the switches 18, 19a and 20 are switched from the a terminal side to the b terminal side, the mode can be shifted with no change in the output voltage vector Va by setting the start-up primary magnetic flux command value φγ_K* as the initial value of the value φγ_T*' being the output of the filter 17a while at the same time correcting a phase θ being the output of an integrator 11 by the amount corresponding to an axial error Δθ.

Therefore, when the steady state control unit calculating the voltage command value on the basis of the voltage equation according to the primary magnetic flux control is used as described above, the effect similar to that of the first embodiment can be obtained by including a start-up control unit that calculates the voltage command value according to the magnitude of the phase current of the three-phase synchronous motor and the steady state control parameter initial value calculation unit that calculates the initial value of the control parameter in the steady state control unit such that the output voltage vectors correspond in switching from the start-up control unit to the steady state control unit.

The present invention includes not only the synchronous motor control device described in the first and second embodiments but also a method of controlling the synchronous motor. That is, the present invention includes the method of controlling the synchronous motor, the method including: a step of calculating and outputting a start-up voltage command value on the basis of the phase current of the synchronous motor and the DC voltage of the DC power supply; a step of calculating and outputting a steady state voltage command value by using the voltage equation; and a step of calculating an initial value of a steady state control parameter such that the output voltage vector to the synchronous motor by the start-up voltage command value corresponds with the output voltage vector to the synchronous motor by the steady state voltage command value when the voltage command value used in converting DC power of the DC power supply into AC power is switched from the start-up voltage command value to the steady state voltage command value. The synchronous motor can be started up stably by controlling the synchronous motor as described above to be able to reduce an impact on the environment.

In the step of calculating the initial value of the steady state control parameter, as described in the first and second embodiments, it is preferred that the magnitude and phase of the output voltage vector from the inverter main circuit to the synchronous motor in the steady state be approximated in every control cycle by repetitive calculation. This is because the output voltage vector in the steady state can converge to the output voltage vector at the start-up even when the current detector and the voltage detector give false detection due to noise.

The present invention also includes a compressor driving device including the synchronous motor control device described in the first and second embodiments and a permanent magnet synchronous motor connected to a compressor. That is, the synchronous motor control device described in the first and second embodiments is applicable to the compressor driving device driving the compressor, where such compressor driving device enables stable start-up.

Such compressor driving device is also applicable to a compressor circulating a refrigerant of an air conditioner, where the present invention also includes the air conditioner including such compressor. Such air conditioner can be started up stably.

The configuration according to the aforementioned embodiments merely illustrates an example of the content of the preset invention, and can thus be combined with another known technique or partially omitted and/or modified without departing from the gist of the present invention.

The invention claimed is:
1. A synchronous motor control device comprising:
an inverter main circuit that is connected to a DC power supply and formed of a plurality of switching devices;
a synchronous motor that is driven by AC power output from the inverter main circuit;
a current detector that detects a phase current value of the synchronous motor;
a voltage detector that detects a DC voltage value of the DC power supply; and
an inverter controller that receives an angular velocity command value, the phase current value, and the DC voltage value as input, generates a PWM signal used to control turning on and off of the plurality of switching devices, and outputs the signal to the inverter main circuit, wherein:

the inverter controller operating in a different operating mode at the time of start-up and in a steady state includes:
- a PWM signal generator that generates the PWM signal output to the inverter main circuit,
- a start-up controller that outputs a start-up voltage command value corresponding to the phase current value to the PWM signal generator when operating in the operating mode at the time of start-up,
- a steady state controller that calculates a steady state voltage command value by using a voltage equation and outputs the value to the PWM signal generation unit when operating in the operating mode in the steady state, and
- a steady state control parameter initial value calculator that outputs an initial value of a control parameter to be used in the steady state controller to the steady state controller such that an output voltage vector from the inverter main circuit to the synchronous motor remains the same before and after switching from the operating mode at the time of start-up to the operating mode in the steady state;

the voltage equation is $$\begin{bmatrix} V\gamma\_T^* \\ V\delta\_T^* \end{bmatrix} = \begin{bmatrix} Ra & -\omega 1 \cdot Lq \\ \omega 1 \cdot Ld & Ra \end{bmatrix} \begin{bmatrix} I\gamma\_T \\ I\delta\_T \end{bmatrix} + \begin{bmatrix} 0 \\ \omega 1 \cdot \phi f \end{bmatrix} + \begin{bmatrix} K\gamma \\ K\delta \end{bmatrix} \cdot Icmp;$$

compensation term $Icmp = Ix^* iy\_T + Kcmp \cdot I\delta\_T^2$;

$V\gamma\_T^*$ is a steady state γ-axis voltage command value output by the steady state controller;

$V\delta\_T^*$ is a steady state δ-axis voltage command value output by the steady state controller;

Ra is a phase resistance that is a motor parameter;
Ld is a d-axis inductance that is a motor parameter;
Lq is a q-axis inductance Lq that is a motor parameter;
Φf is an induced voltage constant that is a motor parameter;
Kγ, Kδ, and Kcmp are gains that are set;
ω1 is a primary angular velocity of the motor;
Iγ_T and Iδ_T are the γ-axis current and the δ-axis current used by the steady state controller, respectively; and Ix* is a correction current command value that is the initial value of the control parameter output by the steady state control parameter initial value calculator.

2. A method of controlling a synchronous motor that is driven by an output voltage vector from an inverter main circuit after DC power of a DC power supply is converted into AC power, the method comprising:
- calculating and outputting a start-up voltage command value on the basis of a phase current of the synchronous motor and a DC voltage of the DC power supply;
- calculating and outputting a steady state voltage command value by using a voltage equation; and
- calculating an initial value of a steady state control parameter such that the output voltage vector from the inverter main circuit to the synchronous motor according to the start-up voltage command value is the same as the output voltage vector from the inverter main circuit to the synchronous motor according to the steady state voltage command value when a voltage command value in converting the DC power of the DC power supply into the AC power is switched from the start-up voltage command value to the steady state voltage command value, wherein:

the voltage equation is $$\begin{bmatrix} V\gamma\_T^* \\ V\delta\_T^* \end{bmatrix} = \begin{bmatrix} Ra & -\omega 1 \cdot Lq \\ \omega 1 \cdot Ld & Ra \end{bmatrix} \begin{bmatrix} I\gamma\_T \\ I\delta\_T \end{bmatrix} + \begin{bmatrix} 0 \\ \omega 1 \cdot \phi f \end{bmatrix} + \begin{bmatrix} K\gamma \\ K\delta \end{bmatrix} \cdot Icmp;$$

compensation term $Icmp = Ix^* - i\gamma\_T + Kcmp \cdot I\delta\_T^2$;

$V\gamma\_T^*$ is a steady state γ-axis voltage command value output by the steady state controller;

$V\delta\_T^*$ is a steady state δ-axis voltage command value output by the steady state controller;

Ra is a phase resistance that is a motor parameter;
Ld is a d-axis inductance that is a motor parameter;
Lq is a q-axis inductance Lq that is a motor parameter;
Φf is an induced voltage constant that is a motor parameter;
Kγ, Kδ, and Kcmp are gains that are set;
ω1 is a primary angular velocity of the motor;
Iγ_T and Iδ_T are the γ-axis current and the δ-axis current used by the steady state controller, respectively; and
Ix* is a correction current command value that is the initial value of the control parameter output by the steady state control parameter initial value calculator.

* * * * *